July 2, 1929.  J. E. SCHELL, JR  1,719,312
CLOSURE FASTENER
Filed Sept. 23, 1927

INVENTOR.
J. E. Schell, Jr.

BY

ATTORNEYS

Patented July 2, 1929.

1,719,312

UNITED STATES PATENT OFFICE.

JOHN EDWARD SCHELL, JR., OF FREDERICK, MARYLAND.

CLOSURE FASTENER.

Application filed September 23, 1927. Serial No. 221,523.

This invention relates to a friction adjuster for closures such as, for instance, shutters, doors, windows, or the like.

More specifically, the invention comprehends the idea of providing the operating handle of the adjuster with an attachment operable to shift a clamping device into and out of frictional engagement with the pivot of the adjuster to secure the adjuster in any desired position.

Another and quite important object of the invention is to provide means for clamping the friction sleeve against longitudinal movement with respect to the extension tube.

A still further object of the invention is to provide the handle of my device with a clamping rod capable of simultaneously clamping the device against rotary movement and for locking the friction tube against longitudinal travel.

Figure 1:
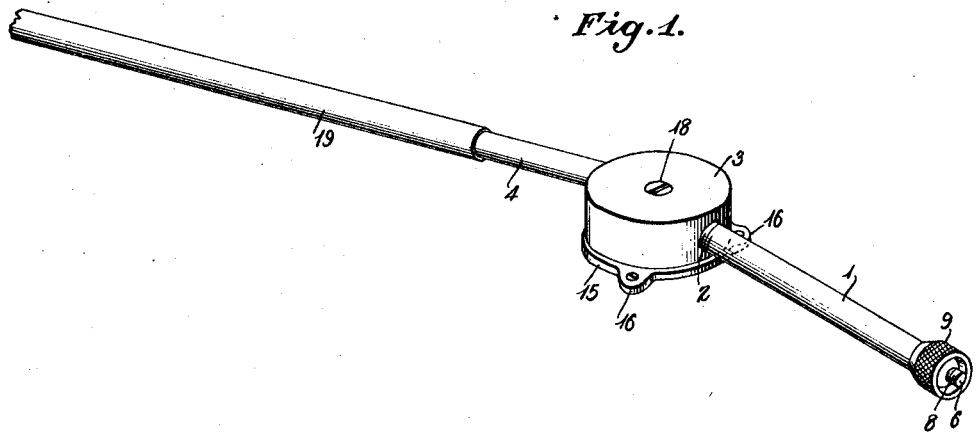
Figure 2:
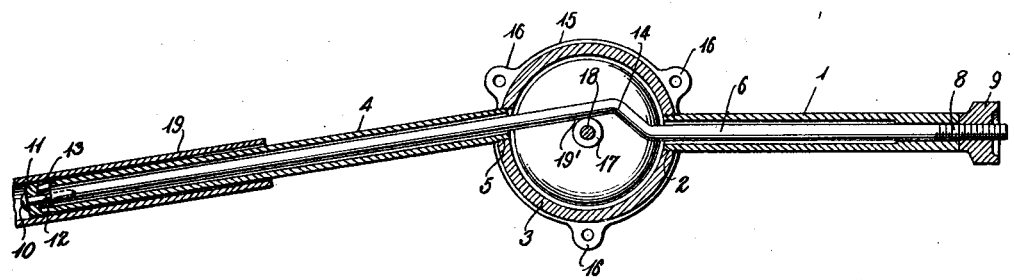
Figure 3:
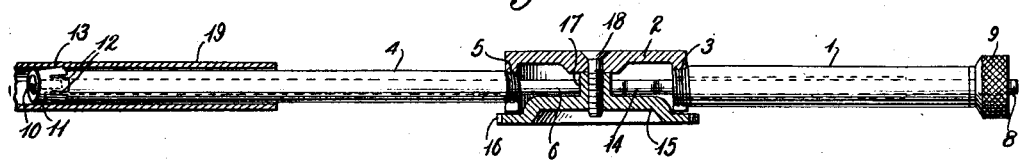

There are numerous other subordinate objects of the invention which will be apparent to those skilled in the art from a reading of the following specification in conjunction with the drawings attached hereto and forming a part hereof in which Fig. 1 is a perspective view of my device, Fig. 2 is a longitudinal sectional view showing the operating mechanism thereof, and Fig. 3 is a view partly in section showing particularly the manner in which the friction device is rotatable.

Referring now specifically to the drawings, 1 designates an operating handle which is screw-threadedly connected to the casing 2. At a point diametrically opposite is located an extension tube 4, likewise threadedly secured to the casing as at 5. The extension tube 4 and the operating handle 1 are of hollow formation and receive the longitudinal shiftable clamping device 6. This clamping device is threaded at its extremity as shown at 8 and receives the adjusting nut 9 whereby the clamping rod 6 may be shifted at the will of the operator. At the other end, the clamping rod 6 is internally threaded to receive the screw 10 which secures the friction cap 11 to the rod. This friction cap is slotted as shown by reference numeral 12. The end of the extension rod 4 is beveled as at 13 to correspond with the beveled friction cap as clearly shown in Fig. 2.

The clamping rod is provided with a bent portion 14 for the purpose hereinafter explained.

The casing 2 aforesaid is located on a support 15, which support may be secured to any desired base by screws or nails engaging the ears 16. This support is provided with an upstanding cylindrical boss 17 which abuttingly engages the under-surface of the casing at the central point thereof and which boss is screw-threaded to receive the screw 18, thereby securing the casing and support together.

The friction sleeve 19 is adapted to be attached to a swinging closure in any well known manner.

It will now be apparent to those skilled in the art that if it is desired to clamp the casing 2 to the support 15 in order that no pivotal or rotatable movement of the casing and the adjuster is possible, it is necessary only to rotate the adjusting screw 9 in a manner to urge the clamping rod 6 inwardly and bring the camming surface 19' of the rod into biting frictional engagement with the exterior of the boss 17. In this position, as portrayed in Fig. 2, the device is incapable of rotary movement and will therefore secure the window or shutter securely in its adjusted position. This inward effort of the clamping rod will simultaneously urge the friction cap 11 into engagement with the beveled extremity 13 of the extension tube 4 and consequently flare or expand the friction cap into biting engagement with the interior of the friction sleeve 11 to thereby clamp the friction sleeve against sliding movement with respect to the extension tube. The device is therefore clamped against both rotary and longitudinal movement. If it is desired to secure a further adjustment of the window, it is necessary only that the adjusting screw be turned in a counter clock-wise direction to unloosen the same and thereafter pushed inwardly to bring the bowed portion of the rod into registration with the boss and relieve its frictional engagement therewith. In this position, the friction cap has likewise become disengaged from the beveled portion of the extension tube and out of frictional engagement with the interior of the friction sleeve. The device may thereupon be rotated by grasping the handle 1 and any desired adjustment of the closure effected.

While I have shown one preferred embodiment of my invention, yet I do not desire to be limited to any of the precise details or arrangements of the parts shown, excepting as may be necessary by the state of the prior art, as I fully realize that many variant forms of construction may be made for accomplishing my result, without departing from the spirit of the invention as expressed in the following claims.

What I claim is:

1. A closure adjuster, comprising a casing, means for rotatably supporting said casing and a handle and extension rod secured to the casing, a clamping rod slidably mounted in the casing, handle and extension rod and means for sliding said rod into a position where it frictionally bites the support to thereby prevent rotative movement of the adjuster.

2. A closure fastener comprising an operating handle and an extension tube therefor, a support therefor, and a clamping rod slidably arranged in the operating handle and extension tube and provided with a portion adapted to be brought into engagement with the support to prevent rotative movement of the handle and extension tube relative to the support.

3. A closure fastener, comprising a casing having an operating handle and extension tube connected therewith, a slidable clamping rod, a support for said rotatable casing, said support having a boss projecting into the casing, and means for adjusting said rod into or out of frictional engagement with said boss to clamp or unclamp the casing against rotatable movement.

4. An adjuster for shutters or other closures, comprising an operating handle, a clamping rod slidably mounted in the operating handle, a support, and means for slidably urging the clamping rod into or out of frictional biting engagement with the support to prevent or permit rotative movement of the handle.

5. A closure fastener comprising a casing, an operating handle secured to the casing at one point and an extension tube secured to the casing at substantially a diametrical point, a clamping rod located within the confines of the casing, operating handle and extension tube respectively, a stationary support for rotatably mounting the casing and provided with a boss extending upwardly into the confines of the casing, means for securing the casing to the support and means for adjusting the slidable clamping rod into or out of frictional engagement with the boss to prevent or permit, respectively, rotative movement of the handle, casing and extension tube.

6. A closure fastener, comprising a casing, an operating handle threadedly secured thereto at one point and an extension tube threadedly secured thereto at substantially a diametrical point, a friction sleeve mounted over the extension tube and slidable in accordance with the closure to be operated, a clamping rod located within the confines of the casing, operating handle and extension tube, said clamping rod being bent to define a pocket, a support adapted to be rigidly secured to an object and provided with an upstanding boss normally fitting within the pocket portion of the clamping rod, means for securing the support and casing together and means for shifting the clamping rod into a camming position with respect to the boss to thereby prevent rotative movement of the casing and its associated parts on said support.

7. A window or other closure adjuster, comprising a casing, an operating handle and extension, a clamping device associated with the adjuster, a stationary support for rotatably mounting the adjuster thereon, of means associated with the operating handle operable to slide the clamping device into a position preventing the rotative movement of the adjuster.

8. A closure fastener comprising an extension element and a handle, means for rotatably supporting the same, and a clamping device associated with the handle for restraining rotary movement of the handle and extension device, and a friction sleeve slidably mounted on the extension element and attachable to the closure, said clamping device being operable to prevent longitudinal movement of the friction sleeve with respect to the handle.

9. A closure fastener comprising an extension element and a handle, means for rotatably supporting said members, a clamping device associated with the handle and extension element, a friction sleeve slidably mounted on the extension element and attachable to the closure, said clamping device being shiftable to a position where it restrains rotary movement of the handle and extension and prevents longitudinal movement of said friction sleeve.

10. A closure fastener comprising an extension element and a handle, a clamping rod mounted within the confines of the extension element and handle, a friction sleeve slidably mounted on the extension element, a friction cap secured to the clamping element and adapted to be expanded into biting engagement with the friction sleeve upon actuation of the clamping rod to thereby restrain sliding movement of the friction sleeve with respect to the extension element.

11. A closure fastener comprising a casing having an extension tube and handle secured thereto, a friction sleeve slidably mounted on the extension tube, a support for rotatably mounting the device, a clamping rod positioned within the confines of the extension element and handle, an expansible friction device secured to the clamping rod, means for effecting sliding action of the clamping rod into a position where it engages the support to restrain rotary movement of the device and also actuates the expansible element to prevent longitudinal movement of the friction sleeve with respect to the extension tube.

12. A closure fastener comprising an extension tube and a handle operatively connected thereto, a friction sleeve mounted on the extension tube and attachable to a shutter or the like, a support for rotatably mounting the device, a clamping rod positioned within the confines of the extension tube, an expansible friction device secured to the clamping rod, means for effecting sliding action of the clamping rod into a position where the expansible friction device engages the extension tube and is thereby spread outwardly into engagement with the friction sleeve to prevent longitudinal movement of the friction sleeve with respect to the extension tube.

13. A closure fastener comprising an extension tube and a handle operatively secured thereto, a friction sleeve slidably mounted on the extension tube, a support for rotatably mounting the device, a clamping rod positioned within the confines of the extension tube and handle, an expansible friction device secured to the clamping rod, means for effecting sliding motion of the clamping rod into a position where the expansible friction device engages the extension tube and is expanded thereby into engagement with the friction sleeve to thereby prevent longitudinal movement of the friction sleeve with respect to the extension tube.

14. A closure fastener of the character described comprising a casing and a support for rotatably mounting the same, said casing having a tubular handle connected therewith and a substantially diametrically opposed tubular extension element, a clamping rod extending within the confines of the tubular handle and extention tube, a friction device secured to one extremity of the clamping rod, a friction sleeve surrounding at least a portion of the extension tube, said clamping rod having a rotatable nut threadedly engaging the same and adapted to shift the clamping rod into a position where the friction device is expanded into engagement with the friction sleeve.

15. A closure fastener of the character described comprising an extension tube and a tubular handle, means for rotatably supporting the handle and extension, a friction sleeve mounted on the extension sleeve and attachable to a shutter or the like and a clamping rod mounted within the tube and handle, an expansible friction cap attachable to the rod, and means for shifting the clamping rod into a position where the expansible cap springs into biting engagement with the friction sleeve to thereby restrain further relative movement between the extension tube and the friction sleeve.

16. A closure fastener of the character described comprising a support and a casing rotatably mounted thereon, a handle screwthreadedly attachable to the casing and extending in one direction and an extension tube threadedly connected to the casing and extending in another direction, a clamping rod fitted within the extension tube, casing and handle respectively, said clamping rod having an expansible device connected thereto and means for shifting the clamping rod into a position to actuate the expansible device into biting engagement with the friction sleeve fitted thereover to prevent relative longitudinal movement as between the extension tube and the friction sleeve.

17. A closure fastener of the character described comprising a support and a casing rotatably mounted thereon, a handle screwthreadedly attachable to the casing and extending in one direction and an extension tube threadedly connected to the casing and extending in another direction, a clamping rod fitted within the extension tube, casing and handle respectively, said clamping rod having an expansible device connected thereto and means for shifting the clamping rod into a position to actuate the expansible device into biting engagement with the friction sleeve fitted thereover to prevent relative longitudinal movement as between the extension tube and the friction sleeve, said rod being shaped to engage with the support to restrain rotative action of the casing relative thereto.

In testimony whereof I affix my signature.

JOHN EDWARD SCHELL, Jr.